Aug. 12, 1947.  T. H. BIRCH  2,425,591
INITIAL QUICK CHARGING VALVE FOR FLUID PRESSURE BRAKES
Filed May 3, 1945  2 Sheets-Sheet 2
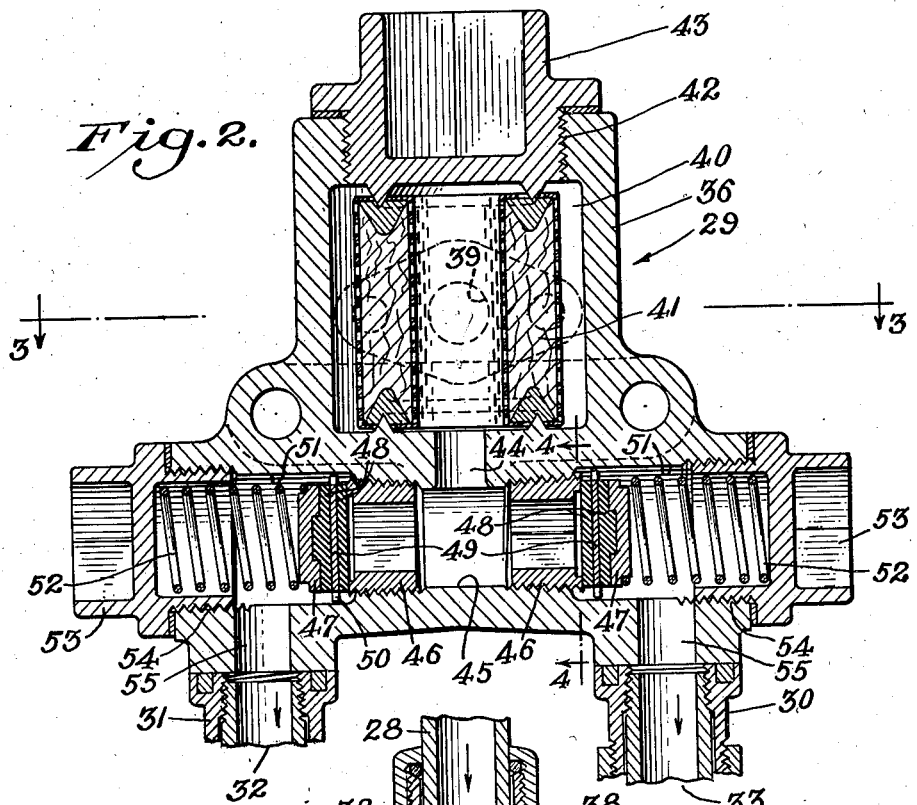
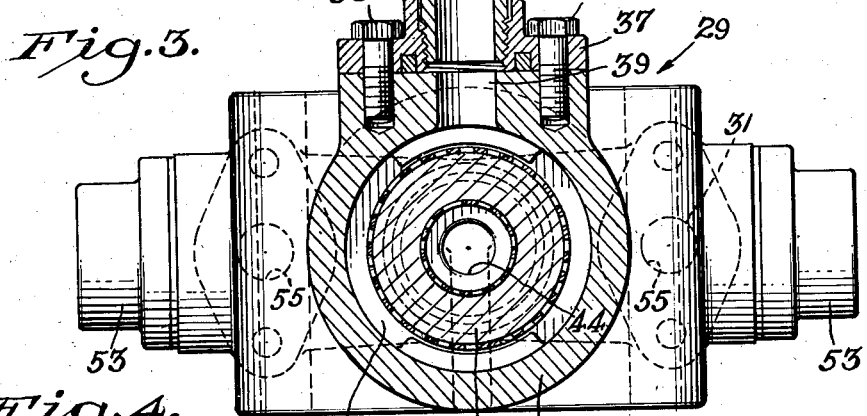
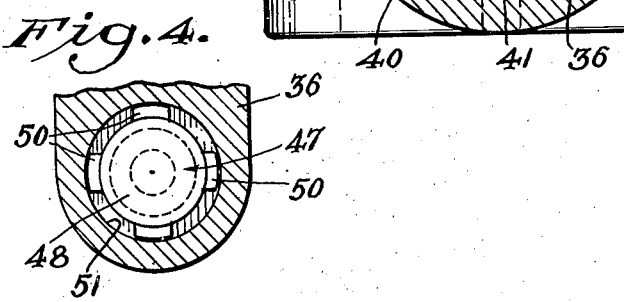
Inventor
Thomas H. Birch
By
Mann and Brown
Attorneys.

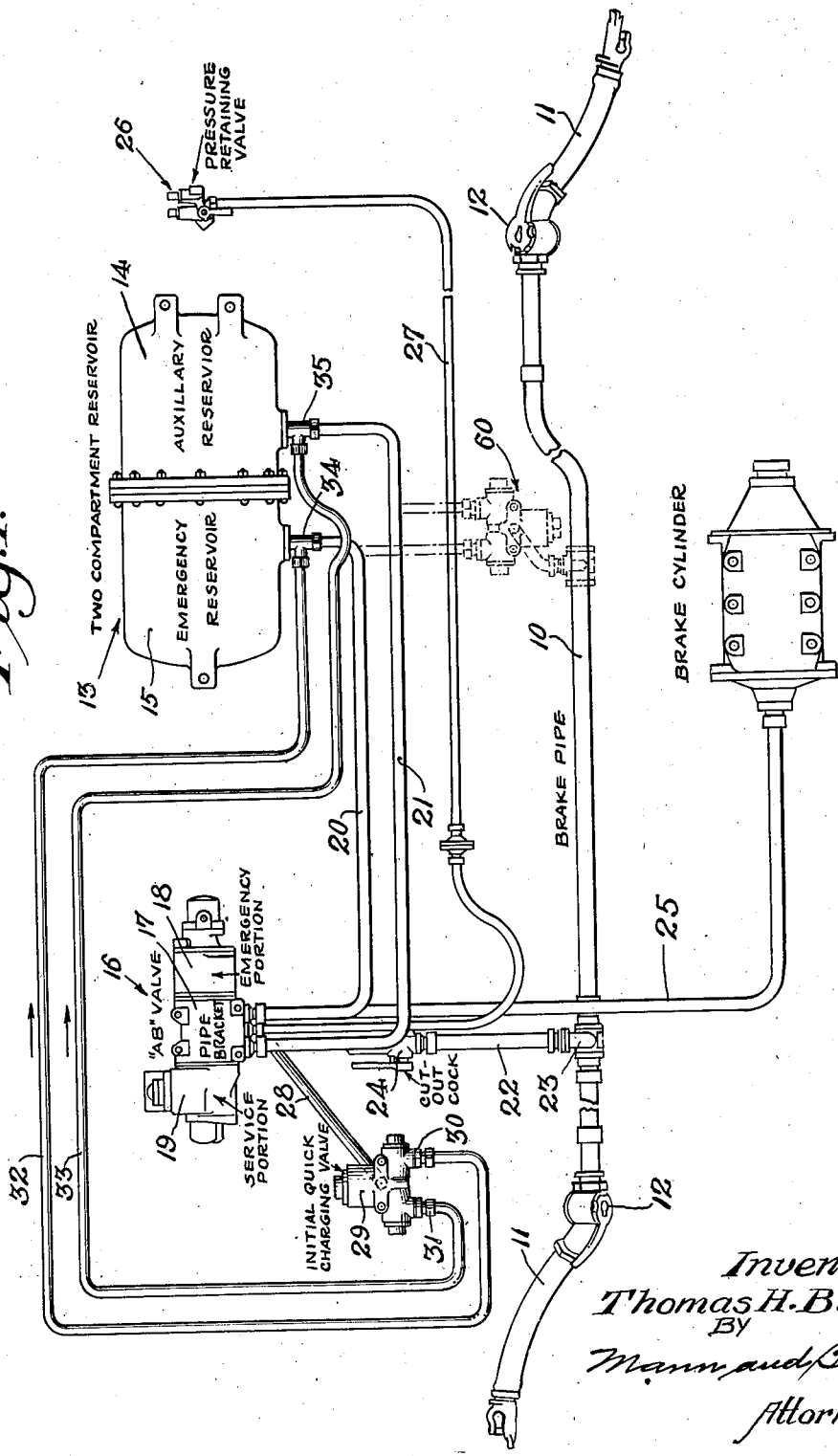

Patented Aug. 12, 1947

2,425,591

UNITED STATES PATENT OFFICE 2,425,591

INITIAL QUICK CHARGING VALVE FOR FLUID PRESSURE BRAKES

Thomas H. Birch, Wauwatosa, Wis.

Application May 3, 1945, Serial No. 591,802

3 Claims. (Cl. 303—64)

The invention illustrated herein is primarily adapted for use in railroad trains where fluid reservoirs are charged to predetermined fluid pressures either from a "yard line" or from the locomotive, and to which a valve is connected for actuating the brakes. When the train is being made up, one of the first things to be done is to charge these reservoirs with fluid, such as compressed air.

The present standard freight car brake equipment is known as type "AB," which includes a so-called AB valve which corresponds in a general way to the triple valve of former standard equipment. The AB valve controls the admission of air to and the exhaust of air from the brake cylinder and also controls the charging of the reservoirs.

The ports and passages in the AB valve and associated connections are so small, or have so much resistance, that the charging of the system on a car—as railroad men express it, charging of one brake—takes from seven to twelve minutes with a sufficient capacity in the yard line or on the locomotive. Seven minutes is the minimum with the AB equipment and the best air supply. A number of indeterminate factors creeping in serve to increase that time and when it reaches fifteen minutes, current rules require the brake to be condemned and the car cut out of the train.

The constricted ports and passages are said to be indispensable to the proper functioning of the AB brake equipment in service. They cannot be increased or made to pass the increased volume of air for quick initial charging without impairing the present scheme of operation in service. With the advent of the AB valve, two reservoirs are used instead of one as formerly, the emergency reservoir and the auxiliary reservoir, thus increasing the fluid capacity of the system and consequently increasing the time necessary for charging.

With an initial charging period of from seven to twelve minutes for one brake, or one car, an hour or more will be required to charge a hundred-car train, the net time being the result of the number of cars and the times in which the charging period varies from the minimum of seven minutes to the maximum of twelve or fifteen minutes.

This loss of time in preparing the train to go on the road after it has been made up or even after the road engine has been coupled to it is very serious when measured solely in unproductive use of the large investment and waste of man power. But in an emergency such as the present that loss is much worse.

The principal object of this invention is to overcome the difficulties mentioned and reduce the initial charging time of the reservoirs to a period on the order of two minutes or less, as compared with the present minimum of seven minutes per car. When the charging time increases beyond the present maximum of fifteen minutes, further time is then lost by the necessity of cutting out a car.

This object is accomplished by the addition of the initial quick charging valve of the present invention between the train line and the reservoirs, which will permit a direct flow of air into the reservoirs, without passing through the AB valve, until a predetermined air pressure has been built up in the reservoirs. After such predetermined pressure has been reached, the initial quick charging valve will automatically close, at which time the flow of air will continue to the reservoirs through the AB valve. This pressure may be on the order of fifty pounds in either or both reservoirs when the shift is made to the AB valve.

This enables the reservoirs to be charged quickly, perhaps within the time required for other preliminaries, and thus the delay occasioned by the slow charging feature of the present AB valve is substantially reduced.

The invention will be described in connection with the standard AB freight brake equipment and mention of that equipment here is intended to take the place of drawings and description of the construction and description of the operation in its various forms, including the AB freight brake equipment, the AB–1–B brake equipment, the AB 4–12 brake for heavy cars, the AB automatic empty and load brake. Car Builders' Cyclopedia, 1943, section II. Westinghouse Air Brake Company Instruction Pamphlet No. 5062, International Textbook Company Freight Car Brake Equipment, vol. 598. But describing the invention in connection with this standard equipment is not intended to place unnecessary limitations on the claims.

In the drawings illustrating the preferred embodiment of the invention

Fig. 1 is a piping diagram of the AB freight brake equipment with the initial quick charging valve of the present invention added thereto;

Fig. 2 is a horizontal section through the initial quick charging valve;

Fig. 3 is a transverse section through the valve on line 3—3 of Fig. 2, and

Fig. 4 is a transverse section through one of the check valves on line 4—4 of Fig. 2.

In Fig. 1 the brake pipe or train line is shown at 10, equipped with hose couplings 11 and angle cocks 12. The two-compartment reservoir 13 for each car includes an auxiliary reservoir 14 and an emergency reservoir 15. The AB valve, generally indicated by 16, includes a pipe bracket 17 carrying an emergency portion 18 at the right and a service portion 19 at the left. Emergency reservoir pipe 20 extending between the pipe bracket 17 and the emergency reservoir 15 serves as a connection between the emergency portion of the AB valve and that reservoir. Auxiliary reservoir pipe 21 extending between the pipe bracket 17 and the auxiliary reservoir 14 serves as a connection between the auxiliary portion of the AB valve and that reservoir.

Air is supplied by a branch pipe 22 connected at one end by a branch line T 23 with the train pipe and at the other end by a cut-out cock 24 with the pipe bracket 17. This cut-out cock is usually combined with a dirt collector, not clearly shown in this diagram.

Air is supplied to the brake cylinder or exhausted from it through a brake cylinder pipe 25 extending between the brake cylinder and the pipe bracket 17 of the AB valve. A pressure retaining valve 26 is connected with the pipe bracket 17 of the AB valve by a pipe 27.

This, in brief, is the fundamental organization of the AB freight equipment.

The initial quick charging valve

The initial quick charging valve is added to the above described AB brake system and in the preferred form it is connected between the combined cut-out cock and dirt collector 24 and the pipe bracket 17 by pipe 28 which thus serves to connect the branch pipe 22, and therefore the train pipe, to the initial quick charging valve generally indicated by 29, which valve has two outlets 30 and 31, respectively connected by pipes 32 and 33 with the emergency reservoir 15 and the auxiliary reservoir 14 through T fittings 34 and 35, indicated in the diagram of Fig. 1.

Flanged union connections are used on the pipe bracket of the AB valve and the reservoirs in the standard construction of the AB freight equipment, and preferably the connections for the initial quick charging valve will be made by removing these connections and inserting suitable adapters having lateral passages for connection with the pipes 28, 32 and 33.

The initial quick charging valve is shown in Figs. 2, 3 and 4. The basis of the valve is a casing 36. As shown best in Fig. 3, the pipe 28 is connected to the casing by a flanged union connection, generally indicated by 37, including the bolts or cap screws 38. This supplies air from the train pipe through the inlet 39, leading to a screen or filter chamber 40, equipped with a cylindrical air strainer 41, like that commonly used in the pipe bracket of the AB valve equipment. It is inserted and removed from the chamber 40 through a threaded opening 42, normally closed by a plug 43.

Air passes from the filter chamber 40 through the duct 44 into a check valve chamber 45 provided at each side with a brass valve seat 46, cooperating with a check valve 47, having a backing composed of a neoprene disk 48, or other suitable rubber-like composition with a brass core 49, having guiding fingers 50 cooperating with the cylindrical wall 51 of the extended valve chamber. Each check valve is urged towards its seat by a helical spring 52 compressed by a plug 53, closing a threaded opening 54, through which the various parts of the valves are inserted for assembly.

Each extended cylindrical portion 51 of the valve chamber communicates with an outlet duct 55, which ducts are connected with the pipes 32 and 33 by flanged union connections 30 and 31.

In a construction that has been found satisfactory the inlet 39 is 7/16 in. in diameter. The chamber 40 is 2¾ in. in diameter. The passages 44 and the outlets 55 are 7/16 in. in diameter. The chamber 45 is 1⅛ in. in diameter, the extension 51 is 1½ in. in diameter, and other dimensions correspond.

The train pipe pressure and the normal pressure in the reservoirs when charged is 70 lbs. which may be increased temporarily for mountain service to 90 lbs.

Operation

In operation when the brakes are to be pumped up on a train ready to take the road, the appropriate valve on the locomotive or the yard line is open to put charging pressure in the train pipe. The auxiliary and emergency reservoirs on each car being empty, or substantially so, the air passes through the branch pipe 22, the cut-out cock 24, the pipe 28, through the initial quick charging valve 29 and the pipes 32 and 33, into the reservoirs 15 and 14. As the pressure builds up in those reservoirs to the selected limit to be determined by conditions, including the pressure of the springs 52, the combined back pressure and the pressure of those springs will close the check valves 47, and when both are closed the initial quick charging valve becomes inoperative and the further charging is accomplished through the AB valve. The two check valves operate independently in opening and closing and respond to the resultant of air pressure and the pressure of springs 52. By varying the pressure of springs 52 and the various passages and connecting piping the speed of charging can be varied to suit conditions and preference, and the pressure at which the charging through the initial quick charging valve will cease can be made whatever is desired.

In addition to initial charging of the cars in a train, the device will also operate to quickly charge the equipment on a car that has just been picked up.

In principle the initial quick charging equipment could be most advantageously connected in practically a direct line between the train pipe 10 and the reservoirs 14 and 15, as indicated generally by the dotted lines 60 in Fig. 1. But that would make it necessary to provide an additional cut-out valve in order to make it possible to cut-out the brake on a car. For that reason it is preferable in practice to make the connection between the branch pipe and the initial quick charging valve at a suitable point on the opposite side of the cut-out cock 24 from the train pipe 10, which is conveniently done as described at the flanged union connection between the combined cut-out cock and dirt collector and the pipe bracket of the AB valve.

This initial quick charging valve should have no other function but to initially charge the air reservoirs to a predetermined amount. It is then automatically cut-out and takes no further part in brake operation.

I claim:
1. In a fluid brake system for railroad cars, wherein emergency and auxiliary fluid reservoirs are adapted to be charged with fluid to predetermined pressures from a main train line for operating the brakes, mechanism for initially and quickly charging both of said reservoirs simultaneously from said train line comprising a pressure regulated valve between said train line and said reservoirs through which fluid is adapted to pass, said valve including two valved outlets, one connected to the auxiliary and one to the emergency reservoirs and so constructed and arranged to selectively charge the individual reservoirs at pressures in accordance with the individual settings of the valved outlets, a brake actuating valve also connected between said train line and said reservoirs, and means included in said actuating valve whereby charging of said reservoirs is completed.

2. In a fluid brake system for railroad cars, wherein two reservoirs are adapted to be charged with fluid to predetermined pressures from a source of fluid supply for operating the brakes, mechanism for initially and quickly charging both of said reservoirs from said source of fluid supply comprising a valve construction having two valved outlets, each connected to a reservoir and so constructed and arranged to selectively charge the individual reservoirs at pressures in accordance with the individual settings of the valved outlets, a brake actuating valve, and means included in said actuating valve whereby charging of said reservoirs is completed.

3. In a fluid brake system for railroad cars, wherein emergency and auxiliary fluid reservoirs are adapted to be charged with fluid to predetermined pressures from a source of fluid supply for operating the brakes, mechanism for initially and quickly charging both of said reservoirs simultaneously comprising pressure regulated valve means having a connection at one side thereof to said source of fluid supply, two valved outlets at another side of said valve means, one of said outlets being connected to the emergency reservoir and the other of said outlets being connected to the auxiliary reservoir, means whereby said valved outlets may be set to be actuated at predetermined fluid pressures to thereby selectively charge the individual reservoirs simultaneously at pressures in accordance with the individual setting of the valved outlets, and brake actuating valve means including mechanism therein whereby charging of the reservoirs is completed.

THOMAS H. BIRCH.

REFERENCES CITED

The following references are of record in the file of this patent:

UNITED STATES PATENTS

| Number | Name | Date |
|---|---|---|
| 572,871 | Dallas et al. | Dec. 8, 1896 |
| 856,665 | Wagner | June 11, 1907 |
| 2,290,983 | McClure | July 28, 1942 |